United States Patent [19]

Yokobayashi et al.

[11] Patent Number: 4,812,909
[45] Date of Patent: Mar. 14, 1989

[54] CELL CLASSIFICATION APPARATUS CAPABLE OF DISPLAYING A SCENE OBTAINED BY SUPERIMPOSING A CHARACTER SCENE AND GRAPHIC SCENE ON A CRT

[75] Inventors: Toshiaki Yokobayashi; Ryohei Yabe; Hajime Matsushita, all of Katsuta, Japan

[73] Assignee: Hitachi, Ltd., Tokyo, Japan

[21] Appl. No.: 79,959

[22] Filed: Jul. 31, 1987

[30] Foreign Application Priority Data

Aug. 12, 1986 [JP] Japan ................. 61-189303

[51] Int. Cl.⁴ ...................... H04N 5/272; H04N 5/262
[52] U.S. Cl. ...................... 358/183; 358/22; 382/6
[58] Field of Search ............ 358/183, 182, 181, 22, 358/903; 340/721, 705; 382/6

[56] References Cited

U.S. PATENT DOCUMENTS

| | | | |
|---|---|---|---|
| 3,805,028 | 4/1974 | Morton | 340/146.3 |
| 3,827,804 | 8/1974 | Miller et al. | 382/6 X |
| 3,946,361 | 3/1976 | Cruttwell et al. | 382/6 X |
| 3,970,774 | 7/1976 | Bazin et al. | 358/182 X |
| 3,993,861 | 11/1976 | Baer | 340/721 X |
| 3,993,864 | 11/1976 | Pye et al. | 358/183 |
| 4,175,859 | 11/1979 | Hashizume et al. | 356/39 |
| 4,202,037 | 5/1980 | Glaser et al. | 340/705 X |
| 4,218,707 | 8/1980 | Reed et al. | 340/722 X |
| 4,404,683 | 9/1983 | Kobayashi et al. | 382/6 |
| 4,425,581 | 1/1985 | Schweppe et al. | 358/183 X |
| 4,496,966 | 1/1985 | Hausdörfer et al. | 358/22 |
| 4,498,098 | 2/1985 | Stell | 358/22 |
| 4,591,897 | 5/1986 | Edelson | 358/182 X |
| 4,599,611 | 7/1986 | Bowker et al. | 358/183 X |
| 4,644,401 | 2/1987 | Gaskins | 358/183 |
| 4,675,736 | 6/1987 | Lehmer et al. | 358/183 |

OTHER PUBLICATIONS

CAS 100 System, Introducing Quantitative Imaging Diagnostics, 1985.
Catalog of Hitachi's 806 Type Apparatus for Automated Classification of Blood Cells.
Capozzi, "Video Mixer", IBM Technical Disclosure Bulletin, Apr. 1973, p. 3558.

Primary Examiner—James J. Groody
Assistant Examiner—E. Anne Faris
Attorney, Agent, or Firm—Fay, Sharpe, Beall, Fagan, Minnich & McKee

[57] ABSTRACT

A first video signal is obtained by picking up an image of a sample by a TV camera. A second video signal representing character information regarding the sample is derived from a memory connected to a computer system. The first and second signals are superposed to obtain a sum signal representing a combined single scene, and the sum signal is displayed as a visible picture on a display device. Before the step of superposition of the first and second video signals, at least one of the video signals may be multiplied by a weight.

13 Claims, 5 Drawing Sheets

CELL CLASSIFICATION APPARATUS CAPABLE OF DISPLAYING A SCENE OBTAINED BY SUPERIMPOSING A CHARACTER SCENE AND GRAPHIC SCENE ON A CRT

BACKGROUND OF THE INVENTION

This invention relates to an image display apparatus, and more particularly to an apparatus of the kind above described which is suitable for application to, for example, an apparatus for automated classification of blood cells so as to simultaneously display two or more different scenes such as a picture scene displaying an image of a blood sample and a character scene displaying data regarding the blood sample, so that an operator can observe the combined scenes on a single CRT.

A prior art apparatus for automated classification of blood cells is disclosed in U.S. Pat. No. 4,175,859. In such an apparatus, an operator required to observe not only a picture scene 1 displaying, for example, the state of a blood sample containing white blood cells 3 and red blood cells 4 as shown in FIG. 1a, but also a character scene 2 displaying data regarding the blood sample as shown in FIG. 1b. It has been a prior art practice that, for the purpose of observation of these plural scenes, an operator manipulates an input keyboard to change over between the scene shown in FIG. 1a and that shown in FIG. 1b. The manner of change-over between these scenes is disclosed in a catalog of "Hitachi's 806 Type Apparatus for Automated Classification of Blood Cells" published by Hitachi Ltd. in March, 1985. However, this prior art apparatus had a drawback that the operator could not simultaneously observe separate scenes. It will be very convenient for an operator of this kind of automated classification (analysis) apparatus when a picture scene displaying an image of a sample and a character scene displaying data regarding the sample can be simultaneously observed by the operator.

SUMMARY OF THE INVENTION

It is an object of the present invention to provide an image display system which can display a plurality of different information in an overlapping relation in the same scene in spite of a simple structure.

The above object of the present invention is attained by merely electrically adding a plurality of video signals by an adder.

This invention is based on the fact that the inventors have found that, even when a picture scene 1 as shown in FIG. 1a and a character scene 2 as shown in FIG. 1b are displayed in a superposed relation as shown by a scene 100 in FIG. 2, the sample image displayed in the picture scene can be sufficiently clearly identified without being appreciably affected by the characters displayed in the character scene, and the characters displayed in the character scene can also be sufficiently clearly read.

DESCRIPTION OF THE PREFERRED EMBODIMENTS

Figure 1A:
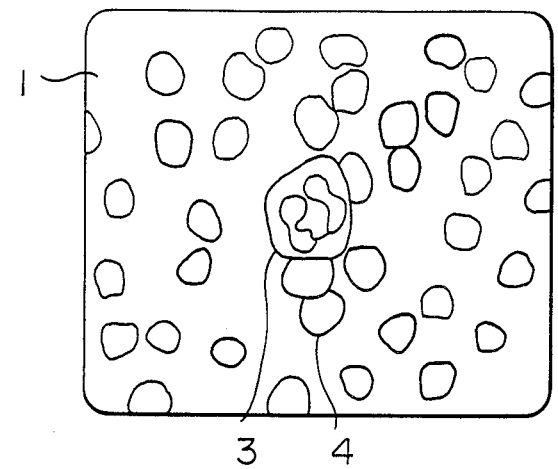
FIGS. 1a and 1b show examples of a picture scene and a character scene displayed in an automated blood-cell classification apparatus, respectively.
Figure 1B:
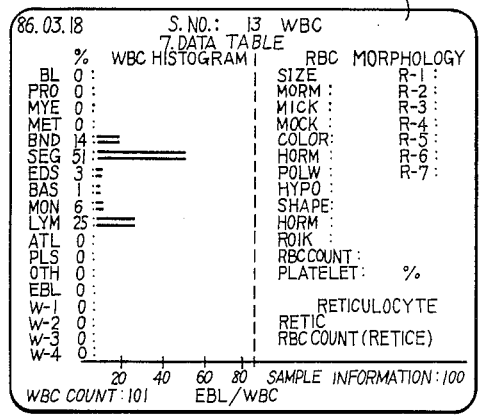
Figure 2:
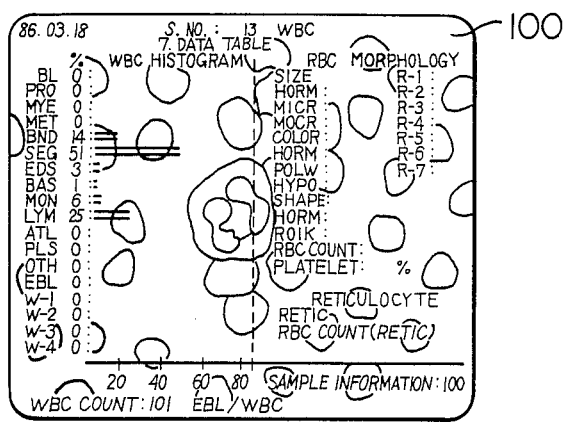
FIG. 2 shows an example of a combination scene displayed according to the present invention.
Figure 3:
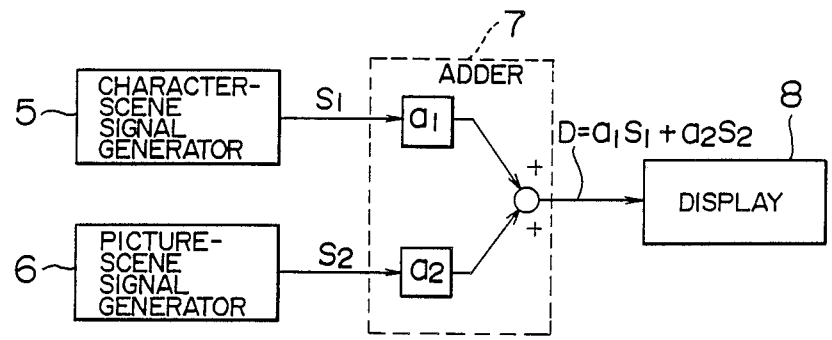
FIG. 3 illustrates the basic principle of the present invention.

FIG. 3 illustrates the basic principle of image display according to the present invention. Referring to FIG. 3, a character-scene signal generator 5 generates a video signal $S_1$ representing a character scene (for example, that shown in FIG. 1b) for displaying data regarding a sample being measured, and a picture-scene signal generator 6 generates a video signal $S_2$ representing a picture scene (for example, that shown in FIG. 1a) for displaying an image of the sample. These video signals $S_1$ and $S_2$ are applied to an adder 7. In the adder 7, the video signals $S_1$ and $S_2$ are added to each other after being multiplied by weights $a_1$ and $a_2$ respectively. The resultant video signal D ($=a_1S_1+a_2S_2$) representing the combined single scene is applied to a display device 8, and a scene 100 as shown in FIG. 2 is displayed on the display device 8. When it is desired to intensify the luminance of one of the character scene and the picture scene thereby emphasizing that scene, the value of the weight associated with that scene is increased. When, for example, the value of the weight $a_1$ is selected to be larger than that of the weight $a_2$, the video signal $S_1$ is displayed with a density larger than that of the video signal $S_2$.

An embodiment of the present invention will now be described with reference to FIGS. 4 and 5.

Figure 4:
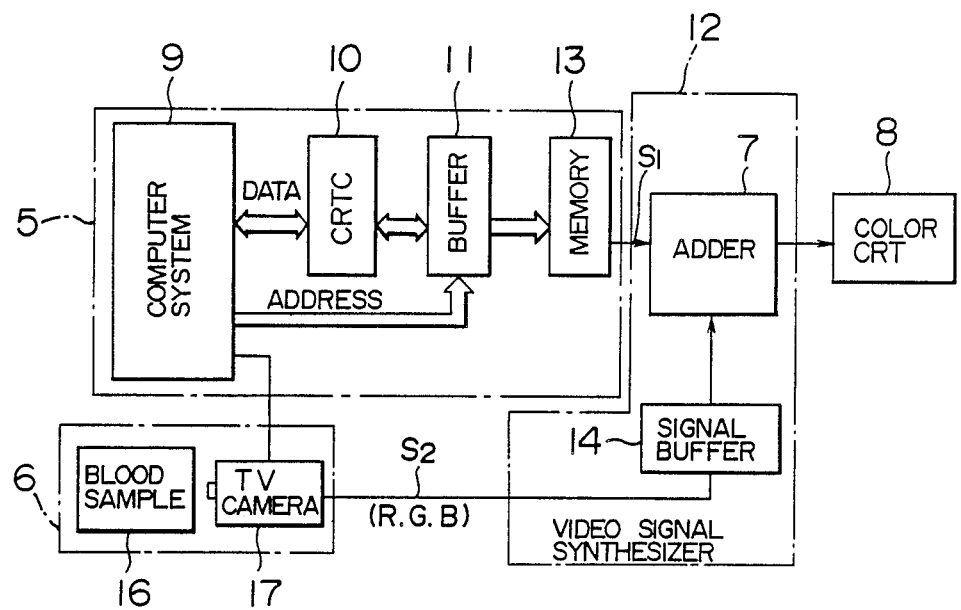
FIG. 4 is a block diagram showing the structure of an embodiment of the present invention.

FIG. 4 shows an automated blood-cell classification apparatus to which the present invention is applied. In FIG. 4, like reference numerals are used to designate like parts appearing in FIG. 3. In the apparatus shown in FIG. 4, a TV camera image of a blood sample 16 including blood cells being classified (a picture scene 1 as shown in FIG. 1a) and a character scene displaying data regarding the blood cells being classified (a character scene 2 as shown in FIG. 1b) are simultaneously displayed on a color CRT 8 as a single scene 100 as shown in FIG. 2.

In FIG. 4, reference numerals 5, 6 and 12 designate a character-scene signal generator, a blood-cell picture-scene signal generator and a video signal synthesizer, respectively. The character-scene signal generator 5 is composed of a computer system 9, a CRT controller 10, an address buffer 11 and a memory 13. The picture-scene signal generator 6 is composed of a TV camera 17 picking up an image of a blood sample 16. The video signal synthesizer 12 is composed of an adder 7 and a video signal buffer 14. A video signal $S_1$ representing a character scene is applied from the memory 13 to the adder 7, and a video signal $S_2$ representing a picture scene is applied from the TV camera 17 to the adder 7 through the video signal buffer 14. These signals $S_1$ and $S_2$ are added to each other by the adder 7, and the resultant sum signal is applied to the color CRT 8 which is the display device displaying both the character data and the blood cell image in an overlapping relation.

Figure 5:
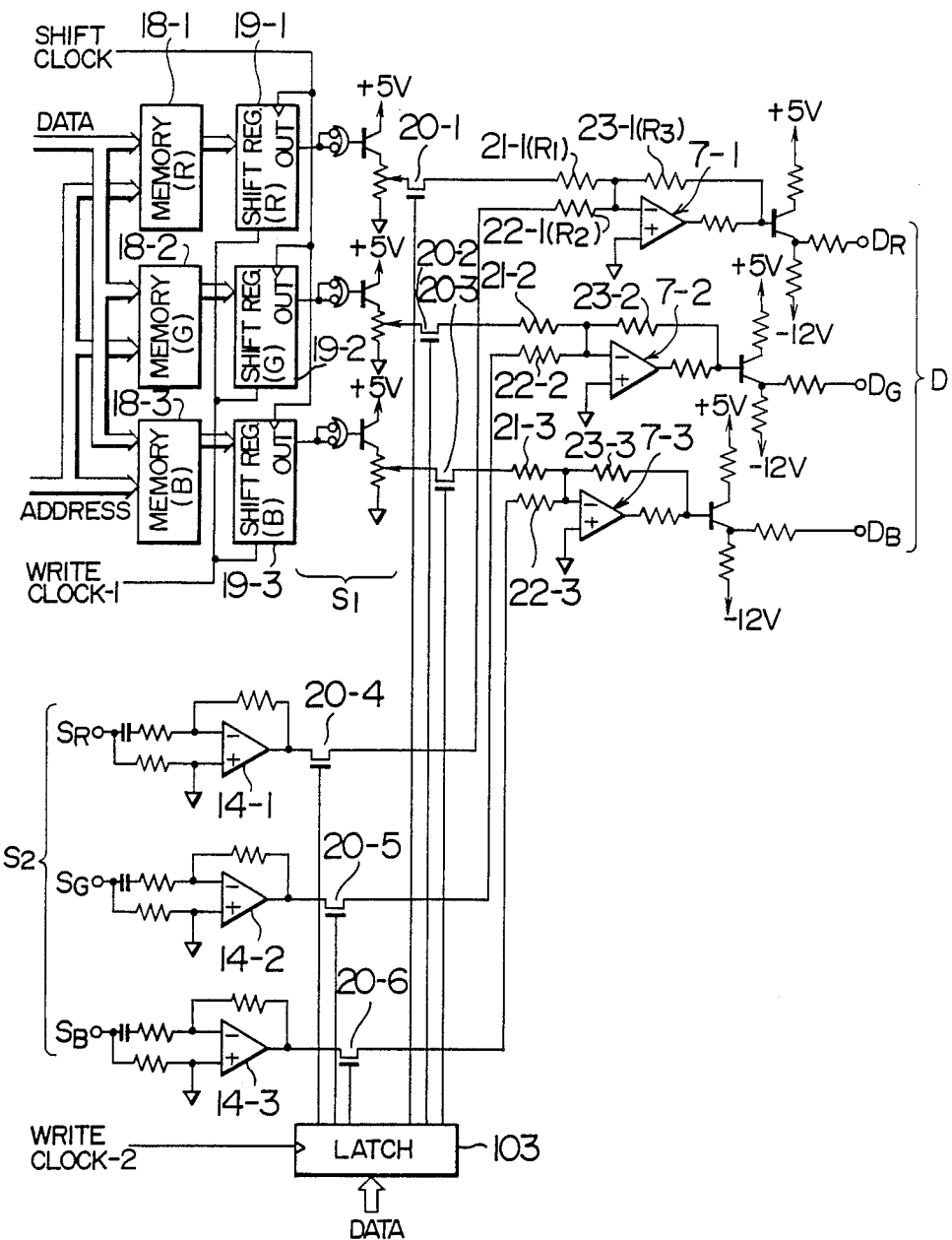
FIG. 5 is a circuit diagram showing in detail the structure of part of the embodiment shown in FIG. 4.

FIG. 5 is a circuit diagram showing in detail the structure of the video signal synthesizer 12.

Referring to FIG. 5, memories 18-1, 18-2 and 18-3 (of, for example, Model HM6116) corresponding to red (R), green (G) and blue (B), which are three primary colors, respectively store character information, and, in response to the application of a write clock signal CLOCK-1, 8-bit parallel data from the memories 18-1, 18-2 and 18-3 are loaded in corresponding ones respectively of shift registers 19-1 19-2 and 19-3 (of, for example, Model 74116). In response to the application of a shift clock signal, the 8-bit parallel data loaded in the individual shift registers 19-1, 19-2 and 19-3 are read out one bit by one bit at a high speed. The data bits read out from these shift registers 19-1, 19-2 and 19-3 are applied to associated inverters (which are, for example, NAND gates of Model 75451) and associated transistors to appear as a video signal $S_1$ for displaying a character scene. After the 8-bit data have been read out from the individual shift registers, next 8-bit data are loaded in the respective shift registers from the associated memories 18-1, 18-2 and 18-3 in response to the application of a write clock signal CLOCK-1.

On the other hand, the TV camera 17 picking up an image of blood cells in a blood sample 16 generates, as its output signal, a video signal $S_2$ for displaying a picture scene. The video signal $S_2$ is disintegrated into signals $S_R$, $S_G$ and $S_B$ (where the suffixes R, G and B indicate that the signals are color signals of red, green and blue respectively). The color signals $S_R$, $S_G$ and $S_B$ are subjected to impedance transformation in signal buffers 14-1, 14-2 and 14-3 (of, for example, Model LH0032) respectively. The video signals $S_1$ and $S_2$ are applied through analog switches 20-1, 20-2, 20-3, 20-4, 20-5 and 20-6 (of, for example, Model IH5036) to adders 7-1, 7-2 and 7-3 (of, for example, Model LH0032) corresponding to the three primary colors respectively. Output signals from the adders 7-1, 7-2 and 7-3 are applied to associated transistors (of, for example, Model 2SC689) to appear as sum video signals $D_R$, $D_G$ and $D_B$ respectively, and these signals $D_R$, $D_G$ and $D_B$ are applied to the color CRT 8.

Output signals of a latch 103 (of, for example, Model 74174) are used to selectively turn on and off the analog switches 20-1 to 20-6, so as to selectively display (i) a character scene only (FIG. 1b), (ii) a picture scene only (FIG. 1a), or (iii) an overlapping scene (FIG. 2) of a character scene and a picture scene, on the color CRT 8. That is, a character scene as shown in FIG. 1b is displayed on the color CRT 8 when the output signals of the latch 103 are used to turn on the analog switches 20-1, 20-2 and 20-3 and to turn off the analog switches 20-4, 20-5 and 20-6. On the other hand, a picture scene as shown in FIG. 1a is displayed on the color CRT 8 by turning off the analog switches 20-1, 20-2 and 20-3 and turning on the analog switches 20-4, 20-5 and 20-6. Also, an overlapping scene as shown in FIG. 2 is displayed on the color CRT 8 by turning on all the analog switches 20-1 to 20-6. The latch 103 controls the analog switches 20-1 to 20-6 by latching data from the computer system 9 shown in FIG. 4 in response to the application of a write clock signal CLOCK-2. The timing of application of the write clock CLOCK-1, write clock CLOCK-2 and shift clock is determined by the computer system 9 and CRT controller 10 shown in FIG. 4.

The weights $a_1$ and $a_2$ (FIG. 3) used for multiplying the video signals $S_1$ and $S_2$ respectively will be described, by taking the adder, including an operational amplifier as 7-1 shown in FIG. 5, as an example. The weights $a_1$ and $a_2$ in this case are determined by the following equations (1) and (2) respectively:

$$a_1 = R_3/R_1 (=0.45) \quad (1)$$

$$a_2 = R_3/R_2 (=0.45) \quad (2)$$

where $R_1$, $R_2$ and $R_3$ are resistance values of resistors 21-1, 22-1 and 23-1 for the operational amplifier 7-1 respectively. The practical numerical values of $R_1$, $R_2$ and $R_3$ are, for example, 2.2 k$\Omega$, 2.2 k$\Omega$ and 1 k$\Omega$, respectively so that the weights $a_1$ and $a_2$ both take a value, 0.45 as shown in the above equations (1) and (2).

Figure 6:
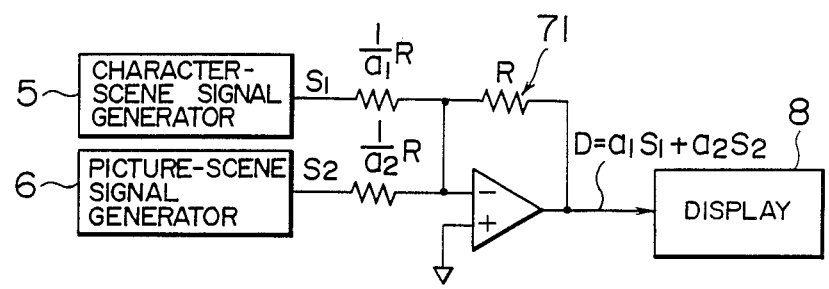
FIG. 6 shows schematically the structure of a modification of part of the embodiment of the present invention when analog video signals are applied as inputs.

FIG. 6 shows an adder 71 preferably used when both the video signals $S_1$ and $S_2$ are analog signals. The adder 71 includes an operational amplifier as shown.

Figure 7:
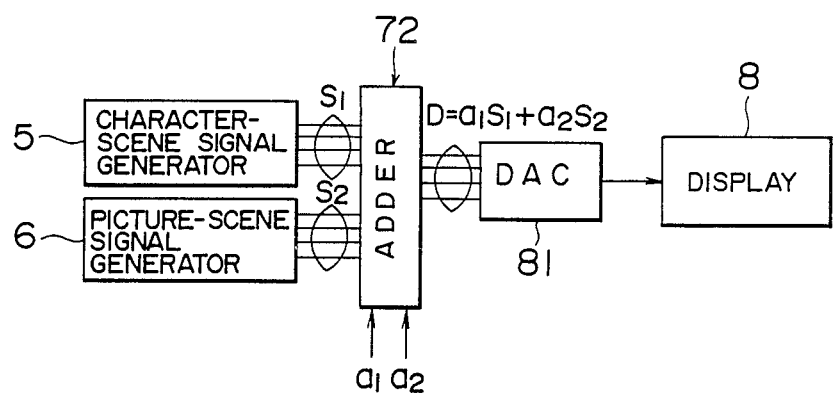
FIG. 7 shows schematically the structure of another modification of part of the embodiment of the present invention when digital video signals are applied as inputs.

FIG. 7 shows an adder 72 preferably used when both the video signals $S_1$ and $S_2$ are digital signals. The digital video signals $S_1$ and $S_2$ applied to the adder 72 are weighted by the weights $a_1$ and $a_2$ respectively to appear from the adder as a sum digital video signal D ($=a_1 S_1 + a_2 S_2$). The sum video signal D is converted by a D/A converter 81 into an analog signal before being applied to the display device 8.

Figure 8:
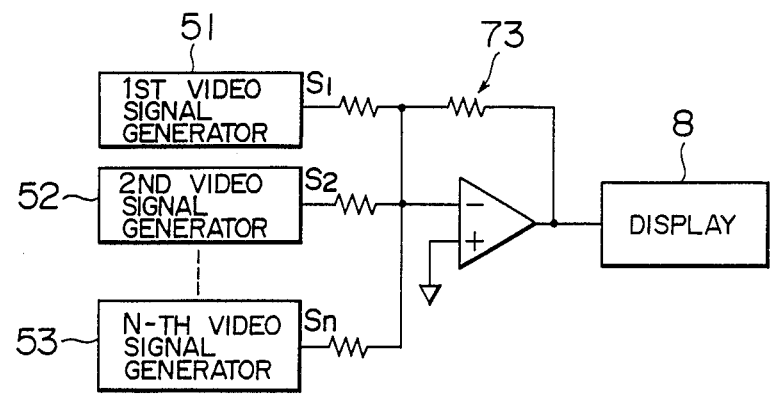
FIG. 8 shows schematically the structure of another modification of part of the embodiment of the present invention when three or more video signals are applied as inputs.

FIG. 8 shows that video signals $S_1, S_2 \ldots, S_n$ generated from a first video signal generator 51, a second video signal generator 52, ..., and an n-th video signal generator 53 (where n is a positive integer larger than or equal to 3) are applied to an adder 73 so as to superpose three or more scenes in a manner well known in the art. The adder 73 includes an operational amplifier as shown.

In the form shown in FIG. 8, difficulty of displaying an easily recognizable scene due to overlapping of scenes can be lessened by suitably selecting the color of character information in relation to image information to be displayed.

Figure 9:
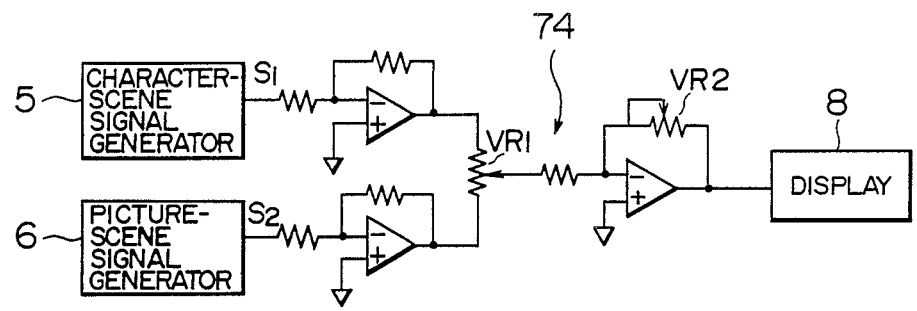
FIG. 9 shows schematically the structure of another modification of part of the embodiment of the present invention, in which the luminance of each of video input signals is made adjustable.

FIG. 9 shows an adder 74 preferably used to multiply two video signals $S_1$ and $S_2$ by suitable weights $a_1$ and $a_2$ respectively. It will be apparent from FIG. 9 that the weights $a_1$ and $a_2$ are continuously changed by a first variable resistor $VR_1$ to adjust the relative luminances of a character scene and a picture scene, and the overall luminance of the combined scene is then adjusted by a second variable resistor $VR_2$. The adder 74 includes operational amplifiers as shown.

The present invention provides the following advantages:

(1) A plurality of different scenes can be simultaneously observed.

(2) A plurality of scenes can be displayed as a single scene without the necessity for provision of a complicated timing circuit. This is readily apparent from the fact that, when a plurality of scenes are to be displayed on a CRT according to, for example, a multi-window method, complicated and troublesome timing control is required so as to change over video signals in synchronism with a horizontal synchronizing signal or to previously prepare data to be displayed in timed relation with the scanning timing of the CRT.

We claim:

1. An image display apparatus for simultaneously viewing data and image information concerning a sample to be measured, comprising:
   a picture-scene signal generator means for generating a video image signal representing an image picture scene for displaying an image of the sample being measured;
   a character-scene signal generator means for generating a video data signal representing a data character scene for displaying data regarding said sample, with the data correlated to the sample as it is when simultaneously appearing in said image;
   adder means connected to said two signal generator means to superimpose the entire video image signal with the entire video data signal so that they do not interfere with each other thereby generating a sum video signal representing a superposed single scene; and
   display means connected to said adder means to display said superposed single scene composed of the superposed entire image picture scene and entire data character scene each transparent to the other in response to the application of said sum video signal.

2. An image display apparatus according to claim 1, wherein at least one of said character scene and said picture scene signal generator means generates three video signals of three primary colors to said display means.

3. An image display apparatus according to claim 1, wherein said adder means multiplies said two video signals by predetermined weights respectively and superposes said weighted video signals.

4. An image display system according to claim 1, wherein said adder means includes at least one operational amplifier to which said video signal representing the character scene and said video signal representing the picture scene are applied as a pair of inputs.

5. An image display apparatus according to claim 3, wherein said adder means includes an operational amplifier to which said two video signals are applied as inputs, and said weights for said video signals are determined by adjusting input resistors and a feedback resistor associated with said operational amplifier.

6. An image display system according to claim 3, wherein said two video signals are digital signals, and said adder means is a digital adder which multiplies at least two digital video signals by weights respectively and adds the weighted signals to each other.

7. An image display apparatus according to claim 1, further comprising switch means inserted between said two signal generators and said adder means to selectively interrupt said two video signals.

8. An image display apparatus according to claim 7, wherein said switch means includes a plurality of analog switches, and said adder means further includes latch means for selectively controlling on-off of said plural analog switches.

9. An image display apparatus for simultaneous viewing of data and image information concerning a sample to be measured, comprising:
   a character-scene signal generator means including a computer system, a CRT controller and a memory to generate a character video data signal representing an entire data character scene displaying data regarding the sample being measured;
   a picture-scene signal generator means including camera means picking up an image of the sample to generate an image video signal representing an entire image picture scene displaying the image of the sample at the location on the sample where the data is measured and at the time of the data character video signal generating;
   adder means adding said video data signal representing the entire data character scene and generated from said character-scene signal generator means to said image video signal representing the entire image picture scene and generated from said image-scene signal generator means to superimpose the entire image video signal with the entire video data signal so that they do not interfere with each other, thereby generating a sum video signal representing the result of addition of the entire data character scene and the entire image picture scene; and
   a display device displaying said sum signal applied from said adder means as a single visible display scene composed of the superimposed entire image picture scene and entire data character scene each transparent to the other.

10. An image display apparatus according to claim 9, wherein said camera means is a TV camera, and said sample is a blood sample whose blood-cell image is picked up by said TV camera.

11. An image display apparatus according to claim 1, wherein said character video signal and said picture video signal are disintegrated into three primary color signals, and pairs of said primary color signals are added by said adder means.

12. An image display apparatus according to claim 1, wherein said sample is a blood sample whose blood cells are to be measured.

13. An image display apparatus according to claim 3, wherein said adder means includes means for changing each of said weights for said two video signals.

* * * * *